US006622485B2

(12) United States Patent
Hung

(10) Patent No.: US 6,622,485 B2

(45) Date of Patent: Sep. 23, 2003

(54) MANUALLY OPERATED ZERO-LOAD RAPID LIFTING HYDRAULIC JACK

(75) Inventor: Michael Hung, Lu Chu Hsiang (TW)

(73) Assignee: Shinn Fu Corporation (TW)

( * ) Notice: Subject to any disclaimer, the term of this patent is extended or adjusted under 35 U.S.C. 154(b) by 124 days.

(21) Appl. No.: 09/912,529

(22) Filed: Jul. 26, 2001

(65) Prior Publication Data

US 2003/0019208 A1 Jan. 30, 2003

(51) Int. Cl.[7] ................................................ F16D 31/02

(52) U.S. Cl. ............................................ 60/477; 60/481

(58) Field of Search ..................... 60/477, 481; 74/103, 74/105; 254/120, 123

(56) References Cited

U.S. PATENT DOCUMENTS 6,199,379 B1 * 3/2001 Hung .......................... 60/479

* cited by examiner

*Primary Examiner*—Edward K. Look
*Assistant Examiner*—Michael Leslie
(74) *Attorney, Agent, or Firm*—Bacon & Thomas, PLLC

(57) ABSTRACT

A manually operated zero-load rapid lifting hydraulic jack. The jack has a lifting arm and a lever which are connected properly together by contacting one another. A lifting arm is formed with an integral receiver portion, which could be in the form of a receiving hole, a receiving tube, a receiving block or any infinite variety of receiver configurations, such that one end of the lever can be inserted into or locate over those receivers as described above. In zero load, as the lever is being pressed downwards and the lifting arm axle serves as a fulcrum to drive the lifting arm to move upwards rapidly to a position of contacting with a lift point.

5 Claims, 6 Drawing Sheets

MANUALLY OPERATED ZERO-LOAD RAPID LIFTING HYDRAULIC JACK

FIELD OF THE INVENTION

The present invention relates to a manually operated zero load rapid lifting hydraulic jack having a lifting arm with an integral receiver portion. When a lever is inserted into the receiver portion and the lever is pressed downward, the lifting arm axle is used as a fulcrum to drive the lifting arm upwards rapidly into a load contacting position.

BACKGROUND OF THE INVENTION

A prior art hydraulic jack, such as a wheeled jack, uses a lever to engage a release valve and actuate the pumping mechanism. As well when engaged into the pumping receiver, the lever is used to position the jack under a lifting point. When the lever is used to engage the release valve to close the hydraulic circuit and then moved into the pumping receiver, the user can pump fluid from the fluid reservoir through a directional valve and then into a chamber which houses a moveable ram member by means of a directional valve, thereby causing the ram member to move at a rate dependent upon the quantity of oil displaced by the pump piston and the effective area presented by the moveable ram member. Generally, the rate at which the moveable ram member causes the lifting arm to raise is slow and gradual and not considered rapid in nature. Under no load condition the rate at which the ram member extends the lifting arm is not noticeably changed from the rate at which it travels under loaded conditions, i.e. the amount of fluid displaced by the pump piston is not increased. Operating force has increased due to the compression of the fluid within the pump and ram chambers under loaded conditions, but rate of travel has not. The user wastes time and labor in his effort to merely contact the lift point, as the pump lever must be moved up and down many times.

Patent application Ser. No. 09/146,432 and 09/766,620 (patented as U.S. Pat. Nos. 6.035.635 and 6,347,786. respectively) teach the prior art. However, these designs utilize an internal hydraulic oil path that relies on multiple rams and/or pump chambers of varying diameters and/or stroke. This method consists of many additional hydraulic unit components, is complex and expensive to manufacture and typically unreliable. Therefore a new design is desirable.

SUMMARY OF THE INVENTION

Accordingly, the primary object of the present invention is to provide a practical means of achieving a manually operated zero-load rapid lifting hydraulic jack having a lifting arm and a receiver integral to the lifting arm, wherein a lever can be inserted in order to accomplish the described quick no-load lift. With the lever engaged, a downward force applied to the lever forces the lifting arm upward to a position that enables contact of the lifting arm pad with the lift point. The receiver may be formed into the lifting arm as a manufacturing process or it may be welded or fixed by other attachment means. The configuration of the receiver may be of various forms; a receiving tube, a receiving hole, a receiving block, or any infinite variety of receiver configurations. The configuration of the receiver being secondary to the importance of the presence of a receiver to accept a lever of corresponding configuration which acts upon the receivers' role as a fulcrum for the purpose of driving the lifting arm upward.

The various objects and advantages of the present invention will be more clearly understood from the following detailed description when read in conjunction with the appended drawings.

DETAILED DESCRIPTION OF THE INVENTION

In order that those skilled in the art can further understand the present invention, a description will be set forth as follows. However, these details and appended drawings are offered only to cause those skilled in the art to understand the object, features and characteristics of the present invention, but not to be construed to confine the scope and spirit of the present invention defined in the appended claims.

Referring to appended drawings, the manually operated zero-load rapid lifting hydraulic jack of the present invention is illustrated. In the present invention, a lifting arm 1 and a lever 2 are connected properly. Thereby, in zero load, a lever 2 can be pressed downward with the lifting arm axle 11 served as a fulcrum to drive the lifting arm 1 moving upwards rapidly to a position for contacting a lift point. Therefore, the jack may lift rapidly in zero load.

Figure 1:
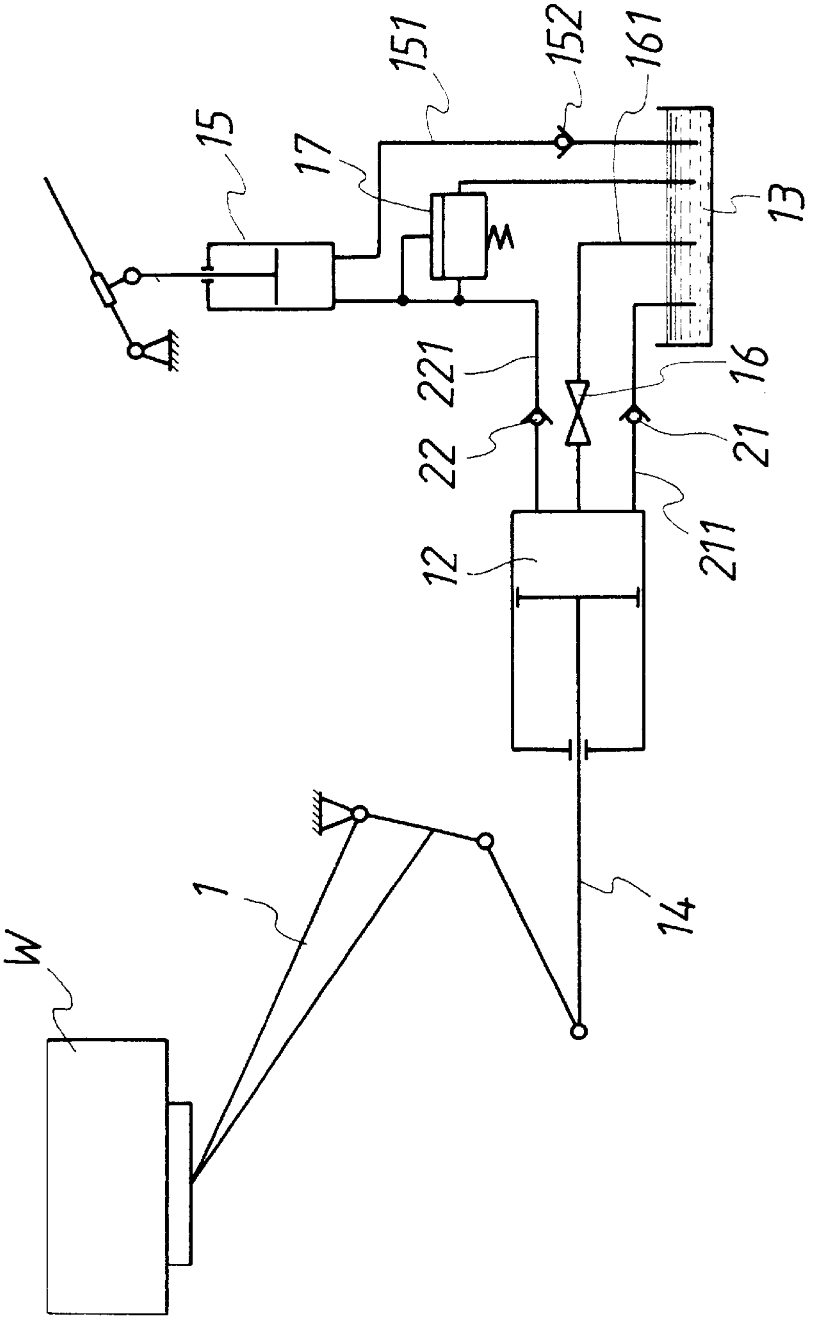
FIG. 1 is a schematic view of the oil circuit typical, but not exclusive of the present invention.

The above jack 10, when in zero load, the lever 2 drives the lifting arm 1 moving upwards rapidly. The oil from working chamber 12 (no-rod chamber) passes through a check valve 21 so as to move the hydraulic oil from the reservoir 13 to fill the working chamber 12 (referring to FIG. 1) so that as driving the lifting arm 1, the piston rod 14 protrudes out so as to lift rapidly. Other than having an oil path 211 communicating to the reservoir 13 and a check valve 21, the working chamber 12 has a check valve 22 communicating to a pump 15, via oil delivery oath 221, and an oil returning path 161, and an unloading valve 16 communicating to the reservoir 13. Another end of the pump 15 is installed with a path 151 and a check valve 152 communicating to the reservoir 13. A safety relief valve 17 is connected between the pump 15 and the working chamber 12. One end of the safety relief valve 17 is communicated to the reservoir 13. As in zero load, the lever 2 will drive the lifting arm 1 and the piston rod 14 to protrude out. Since the working chamber 12 has a pressure lower than that of the reservoir 13, the check valves 21, 22 and 152 will be opened so that the hydraulic oil is sucked and then fills the working chamber 12.

Figure 2:
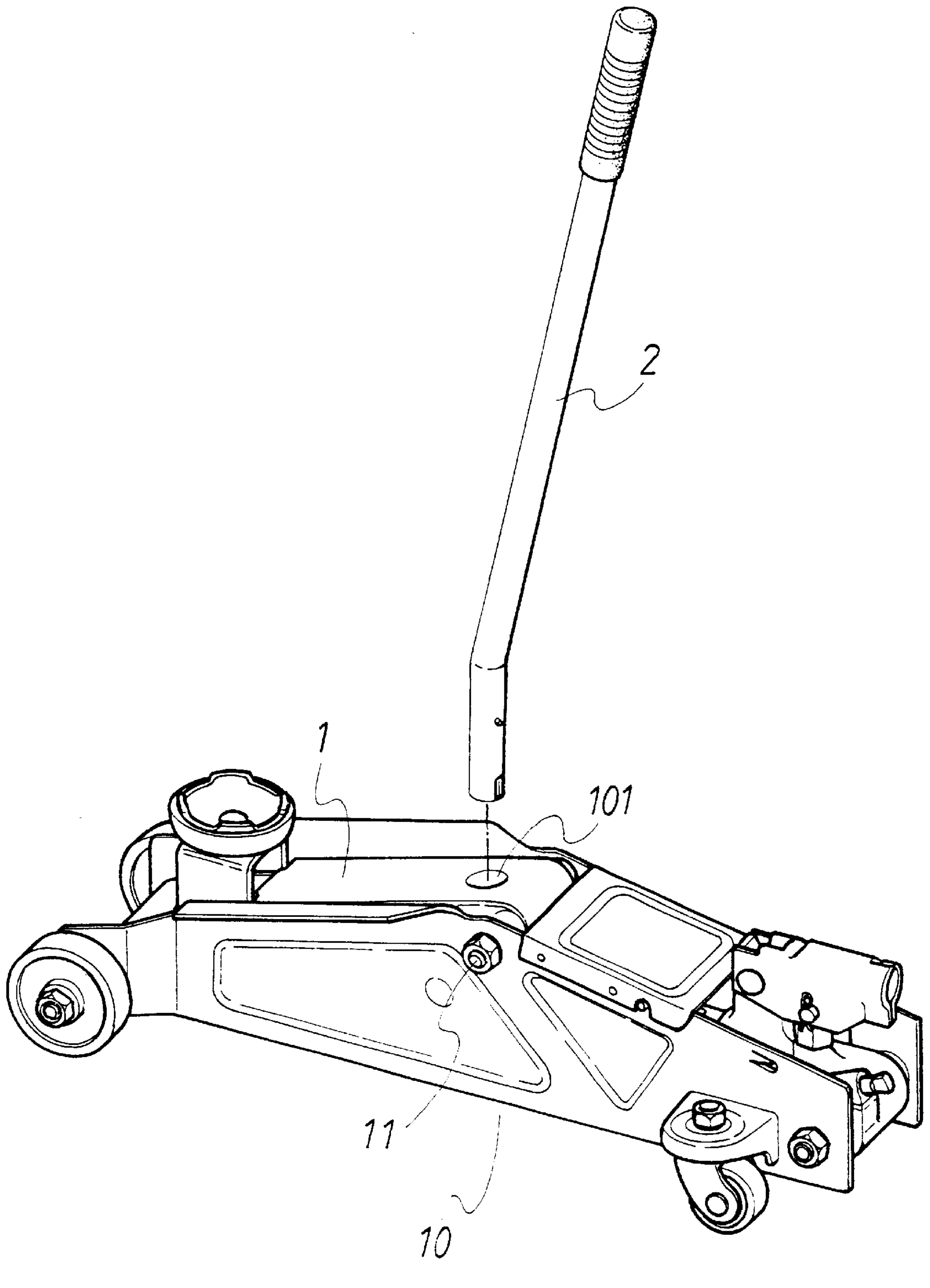
FIG. 2 is an exploded perspective view of the first embodiment in the present invention.
Figure 3:
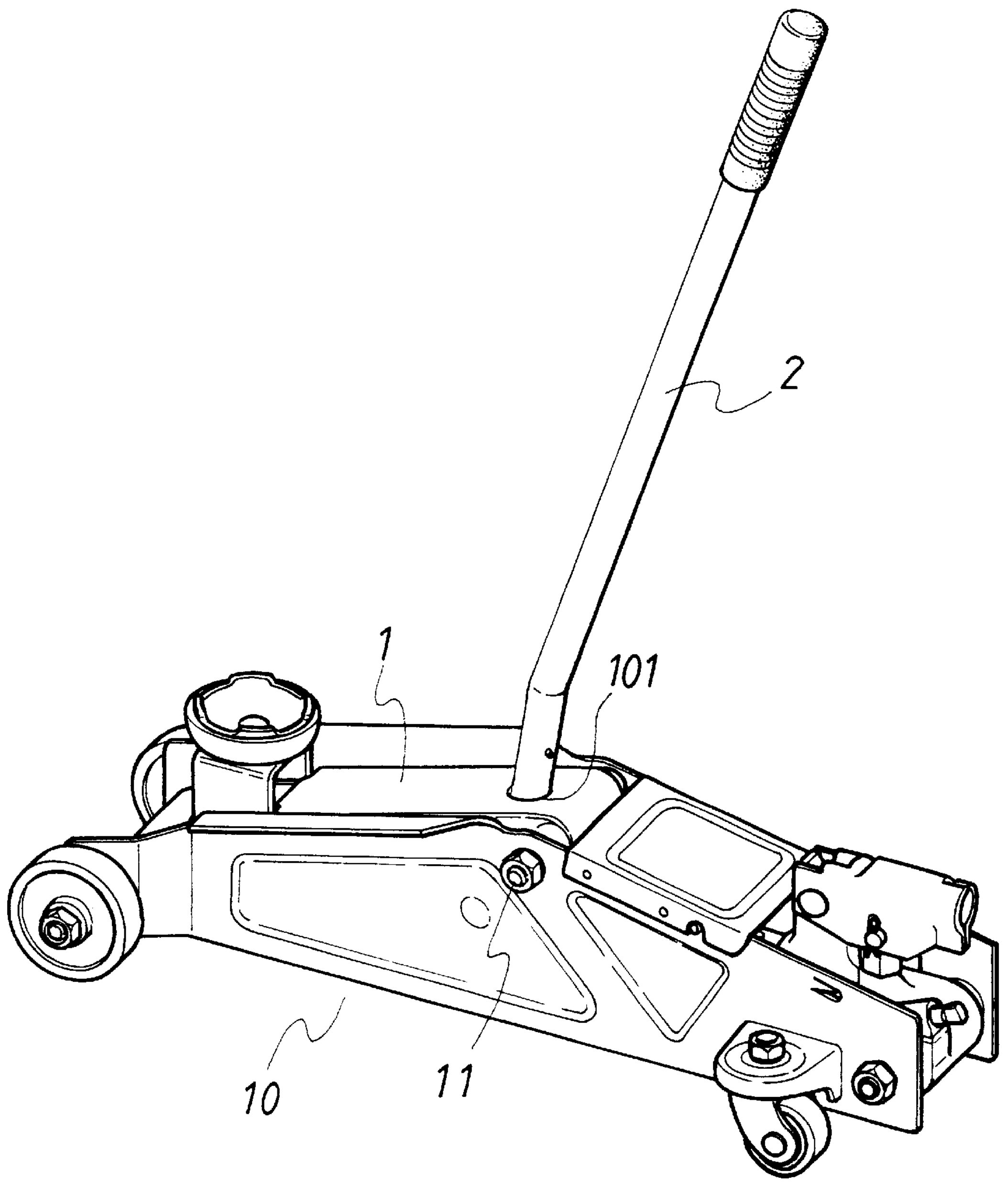
FIG. 3 is an assembled perspective view of the first embodiment in the present invention.
Figure 4:
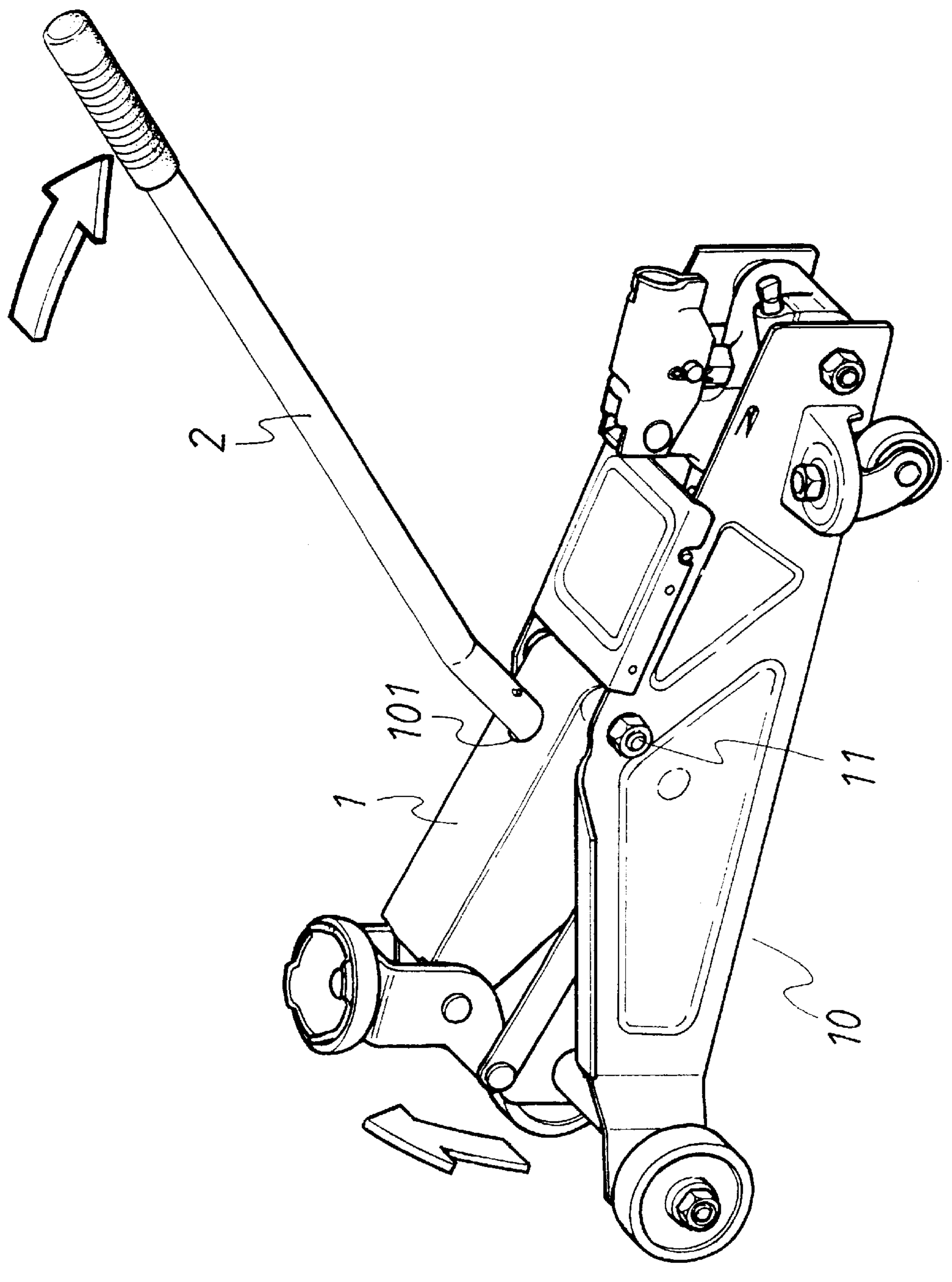
FIG. 4 is a schematic view showing that the receiver is pressed down to drive the lifting arm upwards rapidly under noload condition according to the present invention.

Referring to FIG. 2, the path of the jack lifting arm 1 and the lever 2 is illustrated. The lifting arm 1 is formed with a receiving hole 101, thereby, one end of the lever 2 may insert into the hole (referring to FIG. 3). Therefore, in zero load, by pressing the lever 2 downwards (referring to FIG. 4) the lifting arm 1 is caused to lift upwards rapidly.

Figure 5:
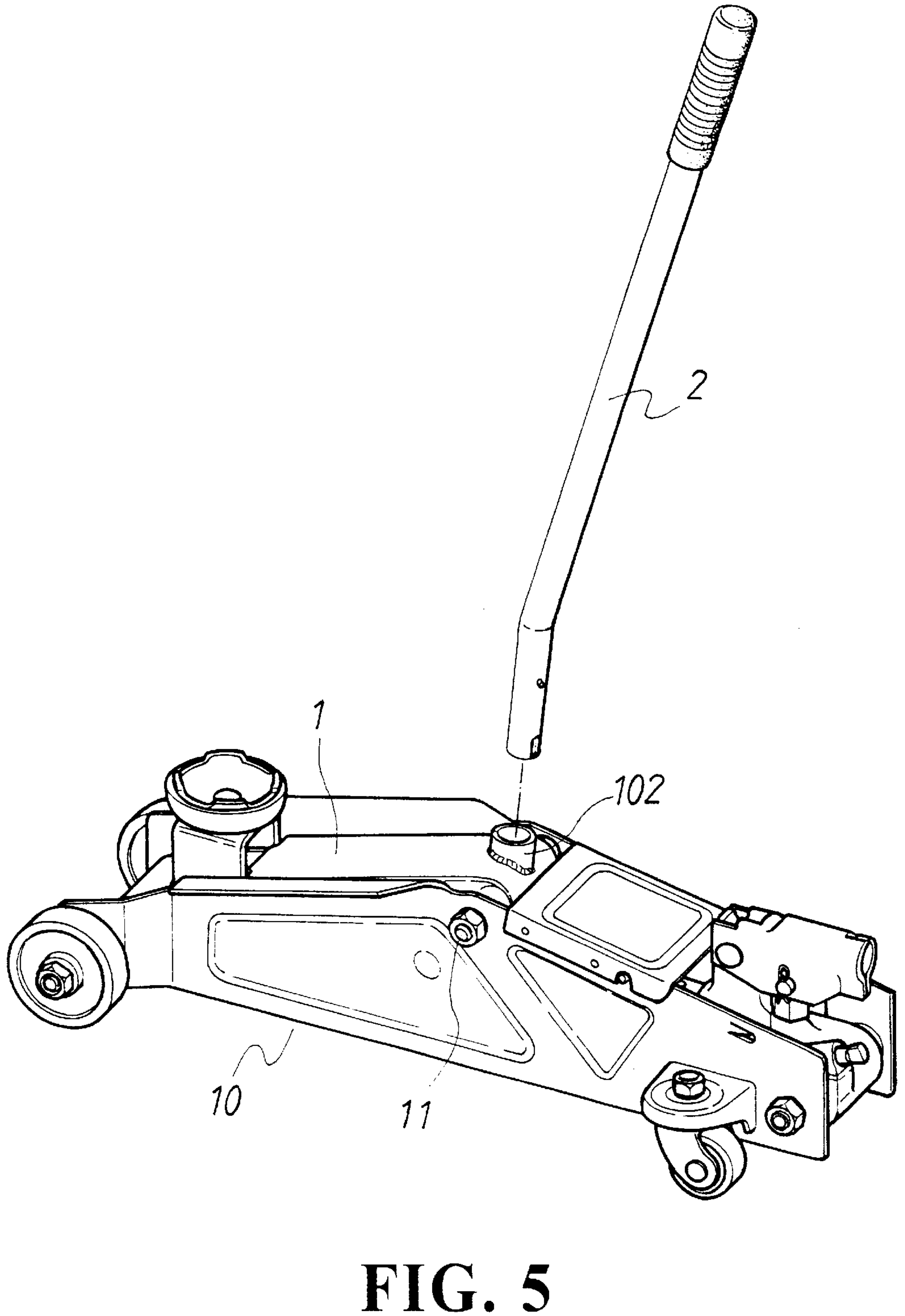
FIG. 5 is a perspective view of the second embodiment of the present invention.

Similarly, the receiving hole 101 may be replaced by a receiving tube 102 (referring to FIG. 5) or a receiving block

Figure 6:
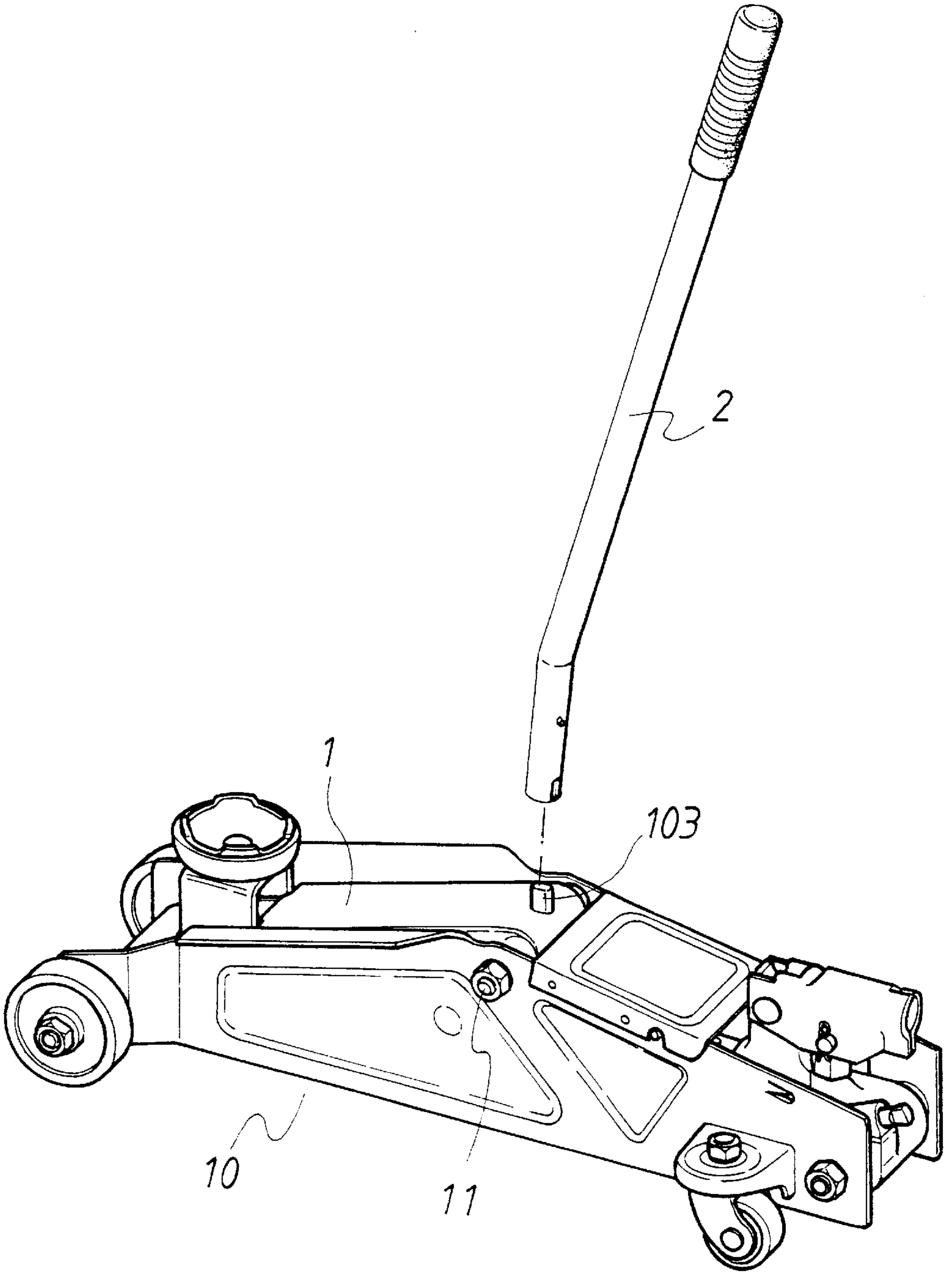
FIG. 6 is an assembled perspective view of the third embodiment of the present invention.

103 (referring to FIG. 6). These designs are beneficial to the lever 2 while it is pressed downwards in zero load, and also use the lifting arm axle 11 as a fulcrum to drive the lifting arm 1 to lift upwards rapidly (now the piston rod 14 protrudes at the same time). Moreover, since the pressure of the working chamber 12 is lower than the internal pressure of the reservoir 13, the check valves 21, 22 and 152 will be opened, and then the hydraulic oil is sucked to fill the working chamber 12. The details will not be described further).

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A manually operated zero-load rapid lifting hydraulic jack having a lifting arm and a lever to be connected together by contacting with one another, thereby, in zero load, a lifting arm axle is used as a fulcrum to drive the lifting arm moving upwards rapidly to a position for contacting with a load.

2. The manually operated zero-load rapid lifting hydraulic jack as claimed in claim 1, wherein the jack further comprises a first oil hydraulic working chamber having a first oil path communicating with a reservoir and a first check valve, a second check valve and an oil delivery path communicating to a pump and an oil return path and an unloading valve communicating to the reservoir, another end of the pump is installed with a second oil path and a third check valve communicating to the reservoir; a safety relief valve is installed to the pump and the working chamber; one end of the safety relief valve is communicated to the reservoir; wherein, as in zero load, the lever drives the lifting arm and a piston rod protrudes out, since the working chamber has a pressure lower than that of the reservoir, the check valves will be opened so that the hydraulic oil is sucked and then fill to the working chamber.

3. The manually operated zero-load rapid lifting hydraulic jack as claimed in claim 1, wherein as a contact way of the jack lifting arm and the lever, a selected position of the lifting arm is formed with a receiving hole, thereby, one end of the lever can insert into the hole; wherein in zero load, by pressing the lever downwards to drive the lifting arm to lift upwards rapidly.

4. The manually operated zero-load rapid lifting hydraulic jack as claimed in claim 1, wherein as a contact way of the jack lifting arm and the lever, a selected position of the lifting arm is welded or fixed with a receiving tube, thereby, one end of the lever can be inserted into the receiving tube.

5. The manually operated zero-load rapid lifting hydraulic jack as claimed in claim 1, wherein as a contact way of the jack lifting arm and the lever, a selected position of the lifting arm is attached or welded with a receiving block, thereby, one end of the lever can locate over the receiving block.

* * * * *